(12) United States Patent
Taniguchi et al.

(10) Patent No.: US 11,309,174 B2
(45) Date of Patent: Apr. 19, 2022

(54) IONIZATION METHOD, IONIZATION DEVICE, IMAGING SPECTROMETRY METHOD, AND IMAGING SPECTROMETER

(71) Applicant: SHIMADZU CORPORATION, Kyoto (JP)

(72) Inventors: Kenichi Taniguchi, Kyoto (JP); Takeshi Uchida, Kyoto (JP); Hiroto Itoi, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 0 days.

(21) Appl. No.: 16/348,935

(22) PCT Filed: Nov. 18, 2016

(86) PCT No.: PCT/JP2016/084353
§ 371 (c)(1),
(2) Date: May 10, 2019

(87) PCT Pub. No.: WO2018/092284
PCT Pub. Date: May 24, 2018

(65) Prior Publication Data
US 2019/0279858 A1    Sep. 12, 2019

(51) Int. Cl.
*H01J 49/00* (2006.01)
*H01J 49/16* (2006.01)
(Continued)

(52) U.S. Cl.
CPC ............ *H01J 49/165* (2013.01); *G01N 27/62* (2013.01); *H01J 49/0004* (2013.01);
(Continued)

(58) Field of Classification Search
CPC ........ G01N 27/62; G01Q 60/42; G01Q 70/08; G01Q 80/00; G01Q 90/00; H01J 49/26;
(Continued)

(56) References Cited

U.S. PATENT DOCUMENTS

| 5,440,122 A | * | 8/1995 | Yasutake | B82Y 35/00 |
| | | | | 250/443.1 |
| 5,935,339 A | * | 8/1999 | Henderson | G01Q 30/20 |
| | | | | 134/1 |

(Continued)

FOREIGN PATENT DOCUMENTS

| EP | 2 017 610 A1 | 1/2009 |
| JP | 2002-298776 A | 10/2002 |

(Continued)

OTHER PUBLICATIONS

International Search Report of PCT/JP2016/084353 dated Jan. 24, 2017 [PCT/ISA/210].

(Continued)

*Primary Examiner* — Wyatt A Stoffa
(74) *Attorney, Agent, or Firm* — Sughrue Mion, PLLC

(57) ABSTRACT

Provided is an ionization method for ionizing a sample 21 adhered to a tip of a probe 11 that is electrically conductive, by applying an ionization voltage to the probe 11 to electrically charge the sample 21. The ionization method includes: subjecting the probe 11 to treatment to make a surface of the probe 11 homogenous; causing adhesion of the sample 21 to the tip of the probe 11; and ionizing the sample 21 by applying the ionization voltage to the probe 11 to electrically charge the sample 21. The treatment for making the surface of the probe 11 homogenous can be implemented by, for example, causing corona discharge at the probe 11.

25 Claims, 10 Drawing Sheets

(51) Int. Cl.
  *G01N 27/62* (2021.01)
  *H01J 49/14* (2006.01)
  *H01J 49/26* (2006.01)
(52) U.S. Cl.
  CPC .......... *H01J 49/145* (2013.01); *H01J 49/168* (2013.01); *H01J 49/26* (2013.01)
(58) Field of Classification Search
  CPC .... H01J 49/165; H01J 49/168; H01J 49/0004; H01J 49/145
  See application file for complete search history.

(56) References Cited

U.S. PATENT DOCUMENTS

| | | | | |
|---|---|---|---|---|
| 8,450,682 | B2* | 5/2013 | Hiraoka | H01J 49/165 |
| | | | | 250/288 |
| 9,377,445 | B2* | 6/2016 | Satake | H01J 49/165 |
| 9,396,915 | B2* | 7/2016 | Platt | H01J 49/0009 |
| 10,481,128 | B2* | 11/2019 | Zaitsu | H01J 49/0031 |
| 2002/0139930 | A1* | 10/2002 | Shiokawa | H01J 49/04 |
| | | | | 250/281 |
| 2002/0171038 | A1* | 11/2002 | Nakagawa | G01Q 60/42 |
| | | | | 250/306 |
| 2009/0140137 | A1* | 6/2009 | Hiraoka | G01N 30/7266 |
| | | | | 250/282 |
| 2012/0037797 | A1* | 2/2012 | Li | G01N 27/62 |
| | | | | 250/282 |
| 2012/0096602 | A1* | 4/2012 | Martines | B82Y 35/00 |
| | | | | 850/40 |
| 2012/0295029 | A1* | 11/2012 | Mirkin | B82B 3/00 |
| | | | | 427/256 |
| 2013/0151190 | A1* | 6/2013 | Platt | H01J 49/0009 |
| | | | | 702/123 |
| 2013/0264496 | A1* | 10/2013 | Arai | H01J 37/08 |
| | | | | 250/489 |
| 2013/0341279 | A1* | 12/2013 | Otsuka | H01J 49/168 |
| | | | | 210/663 |
| 2014/0070089 | A1* | 3/2014 | Otsuka | H01J 49/165 |
| | | | | 250/282 |
| 2014/0070093 | A1* | 3/2014 | Otsuka | H01J 49/26 |
| | | | | 250/288 |
| 2014/0070094 | A1* | 3/2014 | Otsuka | H01J 49/26 |
| | | | | 250/288 |
| 2014/0072476 | A1* | 3/2014 | Otsuka | H01J 49/0454 |
| | | | | 422/83 |
| 2014/0123348 | A1* | 5/2014 | Evans | G01Q 60/42 |
| | | | | 850/53 |
| 2014/0264004 | A1* | 9/2014 | Cooks | H01J 49/04 |
| | | | | 250/282 |
| 2014/0287958 | A1* | 9/2014 | Adams | G01Q 60/42 |
| | | | | 506/12 |
| 2015/0102232 | A1* | 4/2015 | Satake | G01N 27/62 |
| | | | | 250/424 |
| 2015/0226704 | A1* | 8/2015 | Easton | H01J 49/168 |
| | | | | 250/288 |
| 2015/0318157 | A9* | 11/2015 | Otsuka | H01J 49/0459 |
| | | | | 250/282 |
| 2016/0126080 | A1* | 5/2016 | Kertesz | H01J 49/167 |
| | | | | 250/283 |
| 2016/0169937 | A1* | 6/2016 | Labuda | G01Q 20/02 |
| | | | | 850/6 |
| 2016/0231351 | A1* | 8/2016 | Lee | G01Q 70/06 |
| 2017/0236699 | A1* | 8/2017 | Ueda | H01J 49/025 |
| | | | | 250/288 |
| 2018/0047551 | A1* | 2/2018 | Jones | H01J 49/0409 |

FOREIGN PATENT DOCUMENTS

| | | |
|---|---|---|
| JP | 2008-209312 A | 9/2008 |
| WO | 2007/126141 A1 | 11/2007 |

OTHER PUBLICATIONS

Written Opinion of PCT/JP2016/084353 dated Jan. 24, 2017 [PCT/ISA/237].

* cited by examiner

DEVIATION OF RELATIVE INTENSITY FROM AVERAGE VALUE (OBTAINED FROM FOUR MEASUREMENTS) (AVERAGE SHOWN AS 1)

PROBE PROCESSING TIME

CORONA DISCHARGE 0 msec

CORONA DISCHARGE 30 msec

CORONA DISCHARGE 100 msec

CORONA DISCHARGE 300 msec

PROBE PROCESSING TIME

CORONA DISCHARGE 0 msec

CORONA DISCHARGE 30 msec

CORONA DISCHARGE 100 msec

CORONA DISCHARGE 300 msec

IONIZATION METHOD, IONIZATION DEVICE, IMAGING SPECTROMETRY METHOD, AND IMAGING SPECTROMETER

CROSS REFERENCE TO RELATED APPLICATIONS

This application is a National Stage of International Application No. PCT/JP2016/084353, filed Nov. 18, 2016.

TECHNICAL FIELD

The present invention relates to an ionization method and ionization device for ionizing a sample in an ion spectrometer such as a mass spectrometer or an ion mobility spectrometer. The present invention also relates to an imaging spectrometry method and imaging spectrometer employing the ionization method and ionization device. More particularly, the present invention relates to an ionization device for ionizing a sample in an ambience of atmospheric pressure.

BACKGROUND ART

As to biological tissue analysis, mass spectrometry at a plurality of measurement points (measurement target region) on a surface of a biological tissue is sometimes employed for examining the distribution of a substance having a specific mass. Such a technique is called imaging mass spectrometry Patent Literature 1 discloses an ionization method called a probe electrospray ionization (PESI) method that enables imaging mass spectrometry with a spatial resolution at nanometer level.

The PEST method involves placing a probe that is electrically conductive above a measurement target region on a surface of a sample. The PESI method also involves moving the probe downward to bring a tip of the probe into contact with the surface of the sample, and causing adhesion of the sample to the tip of the probe. The PEST method also involves moving the probe upward to an initial position, and applying a voltage of several tens of volts to several thousands of volts (hereinafter, referred to as "ionization voltage") to the probe. This configuration electrically charges the sample adhered to the tip of the probe, and ionizes the sample by Coulomb repulsion. In a case where the substance is solid or less prone to being ionized, the tip of the probe may be irradiated with laser light at the voltage application. Energy thus applied to the sample facilitates the ionization. Ions thus generated are sent to a subsequent stage of the mass spectrometer maintained at a vacuum condition, through an opening formed in a partition wall between an ionization chamber and the subsequent stage. In the subsequent stage, the ions are subjected to mass spectrometry. This process is performed at the plurality of measurement points on the surface of the sample, so that imaging mass spectrometry is performed. According to the PESI method, the use of a probe having a nanometer-scale tip enables imaging mass spectrometry with the spatial resolution at nanometer level.

CITATION LIST

Patent Literature

Patent Literature 1: WO 2007/126141 A1

SUMMARY OF INVENTION

Technical Problem

The present inventor has found that when a target sample containing a target substance at a certain concentration is subjected to measurement while being repeatedly ionized by the PESI method, the peak intensity of a mass spectrum varies for each measurement, resulting in poor reproducibility of the mass spectrum. When a peak intensity is too low, the peak intensity becomes hidden in noise, and thus a normal pattern of peak intensity does not appear in the mass spectrum. In mass spectrometry, the pattern of peak intensity of a mass spectrum obtained from a measurement is checked against patterns of peak intensities of mass spectra of known substances previously stored in a database, and the substance is identified based on the degree of matching or the mass spectrum is subjected to filtering based on whether a predetermined peak intensity appears. However, if the normal pattern of peak intensity cannot be obtained as described above, an accurate result cannot be obtained in the mass spectrometry.

The variations in peak intensity of the mass spectrum for each measurement indicate variations in amount of ions to be generated. In other words, the conventional PESI method brings about unstable sample ionization efficiency.

The foregoing description exemplifies a mass spectrometer however, other ion spectrometers such as an ion mobility spectrometer have a problem similar to that described above.

An object of the present invention is to provide an ionization method and ionization device for ionizing a sample adhered to a tip of an electrically conductive probe, by applying voltage to the probe, where the ionization method and ionization device are capable of stabilizing sample ionization efficiency.

Solution to Problem

In order to achieve the object, the present invention provides an ionization method for ionizing a sample adhered to a tip of a probe that is electrically conductive, by applying an ionization voltage to the probe, the ionization method including:

subjecting the probe to treatment to make a surface of the probe homogenous;

causing adhesion of the sample to the tip of the probe; and ionizing the sample by applying the ionization voltage to the probe to electrically charge the sample.

The present inventor has presumed that the conventional PESI method brings about unstable ionization efficiency since a surface of a probe, to which a sample is not adhered yet, is in an inhomogeneous state, causing variations in an amount of the sample adhered to a tip of the probe or hindering voltage application to the sample. According to the present invention, the probe is subjected to the treatment to make the surface of the probe homogenous before adhesion of the sample to the tip of the probe. The term "homogeneous" used herein involves a state that is electrically homogeneous or physically homogeneous. When the surface of the probe is electrically homogeneous, an electric field, in which the sample adhered to the surface is ionized, becomes homogenous. When the surface of the probe is physically homogeneous, the amount of the sample adhered to the surface becomes constant. Accordingly, the sample ionization efficiency is stabilized as compared with the conventional method. As will be described later in an embodiment, the use of the ionization method according to the present invention enables acquisition of highly reproducible measurement data.

The treatment for making the surface of the probe homogenous may be implemented by various methods. For example, when the treatment is implemented by electrical discharge such as corona discharge or glow discharge, plasma or active oxygen generated at the electrical discharge cleans or reforms the surface of the probe to make the surface homogenous. The treatment implemented by electrical discharge also breaks and removes an insulating film formed on the surface of the probe.

The treatment may also be implemented by ultraviolet light irradiation. In this case, active oxygen generated by the ultraviolet light irradiation cleans or reforms the surface of the probe to make the surface homogeneous. In addition, plasma to be generated by, radiofrequency voltage application or microwave irradiation also cleans or reforms the surface of the probe to make the surface homogenous.

The ionization method according to the present invention may employ not only the PESI method but also an ESI method. Further, the ionization method according to the present invention may be used as an atmospheric-pressure ionization method in an ion spectrometer such as a mass spectrometer or an ion mobility spectrometer. The mass spectrometer or ion mobility spectrometer includes an ionization chamber in an ambience of atmospheric pressure, a spectrometry unit disposed subsequently to the ionization chamber and maintained under a vacuum condition, and a partition wall disposed between the ionization chamber and the spectrometry unit. Ions are sent to the spectrometry unit through an ion introduction tube or a skimmer formed in the partition wall. The ion introduction tube or skimmer is typically made of metal such as stainless steel (SUS). Therefore, corona discharge or glow discharge can be caused at, for example, a position between the probe and the ion introduction tube or skimmer.

In applying the voltage to the probe to electrically charge the sample, the sample may be irradiated with laser light. Energy is thus applied to the sample less prone to being ionized, thereby facilitating the ionization. In implementing the treatment by the ultraviolet light irradiation, a common light source may be used for the purpose of implementing the treatment and the purpose of facilitating the ionization.

A first aspect of the present invention provides an ionization device for implementing the ionization method, the ionization device including:

a probe that is electrically conductive;

a voltage application unit configured to apply a discharge voltage to the probe to cause electrical discharge at the probe and configured to apply an ionization voltage to the probe to electrically charge and ionize a sample adhered to the probe:

a sample introduction unit configured to cause adhesion of the sample to a tip of the probe; and a control unit configured to cause the voltage application unit and the sample introduction unit to apply the discharge voltage to the probe, to cause the adhesion of the sample to the tip of the probe, and to apply the ionization voltage to the probe.

A second aspect of the present invention provides an ionization device for implementing the ionization method, the ionization device including:

a probe that is electrically conductive;

a light source configured to irradiate the probe with ultraviolet light:

a voltage application unit configured to apply an ionization voltage to the probe to electrically charge and ionize a sample adhered to the probe;

a sample introduction unit configured to cause adhesion of the sample to a tip of the probe; and a control unit configured to cause the light source, the voltage application unit, and the sample introduction unit to irradiate the probe with the ultraviolet light, to cause the adhesion of the sample to the tip of the probe, and to apply the ionization voltage to the probe.

A third aspect of the present invention provides an ionization device for implementing the ionization method, the ionization device including:

a probe that is electrically conductive;

a plasma generator configured to generate plasma in a space where the probe is positioned;

a voltage application unit configured to apply an ionization voltage to the probe to electrically charge and ionize a sample adhered to the probe:

a sample introduction unit configured to cause adhesion of the sample to a tip of the probe, and a control unit configured to cause the plasma generator, the voltage application unit, and the sample introduction unit to generate the plasma in the space, to cause the adhesion of the sample to the tip of the probe, and to apply the ionization voltage to the probe.

For example, the plasma generator may be configured to generate plasma by radiofrequency voltage application or may be configured to generate plasma by microwave irradiation.

In the ionization device according to each of the foregoing aspects, the sample introduction unit may include a moving mechanism configured to change a relative position between the probe and the sample to a first position at which the tip of the probe is separate from the sample, and to a second position at which the tip of the probe is in contact with the sample, and the control unit may apply the discharge voltage to the probe at the first position, change the relative position to the second position, and apply the ionization voltage to the probe.

Advantageous Effects of the Invention

The use of an ionization method and ionization device according to the present invention enables stabilization of sample ionization efficiency and acquisition of highly reproducible measurement data.

(without corona discharge) with respect to a measured intensity of an ion at a mass-to-charge ratio (m/z) of 695 for each measurement.

Figure 6:
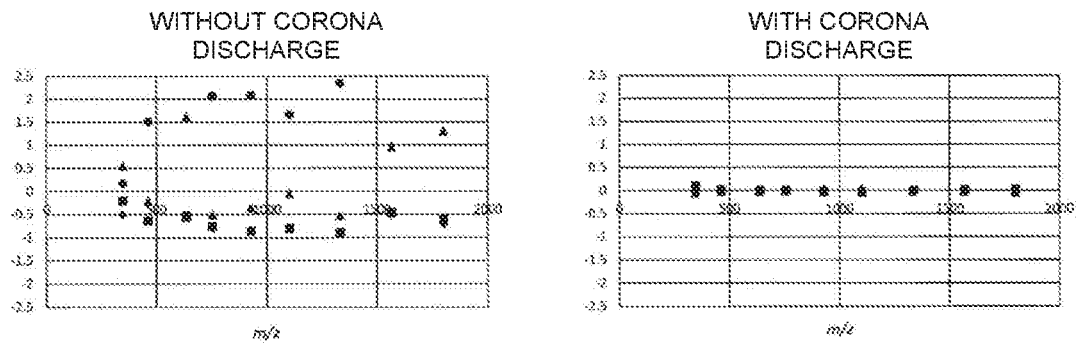

FIG. 6 shows deviations between the measured intensities of the respective ions for the respective measurements and an average value of the measured intensities of the respective ions in Example 2 (with corona discharge) and Comparative Example 1 (without corona discharge).

Figure 7:
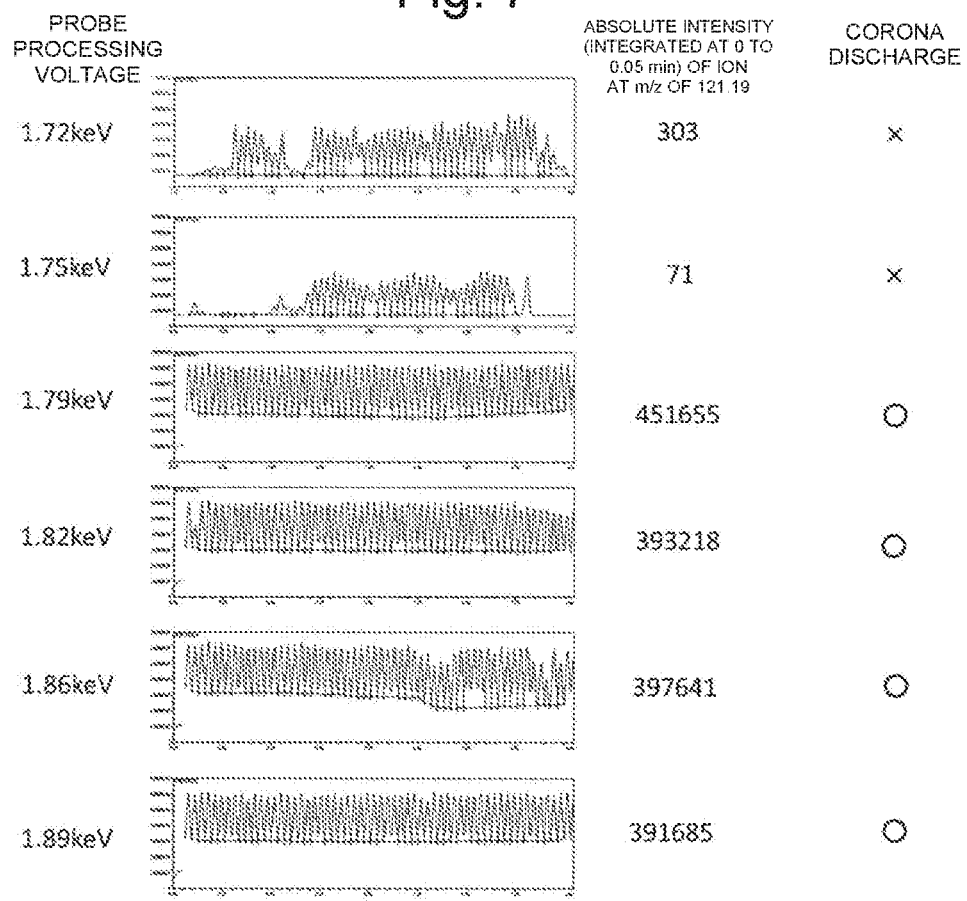

FIG. 7 shows a relationship between a magnitude of a corona discharge voltage and ionization efficiency, based on the temporal changes in measured intensities of all the ions.

Figure 8:
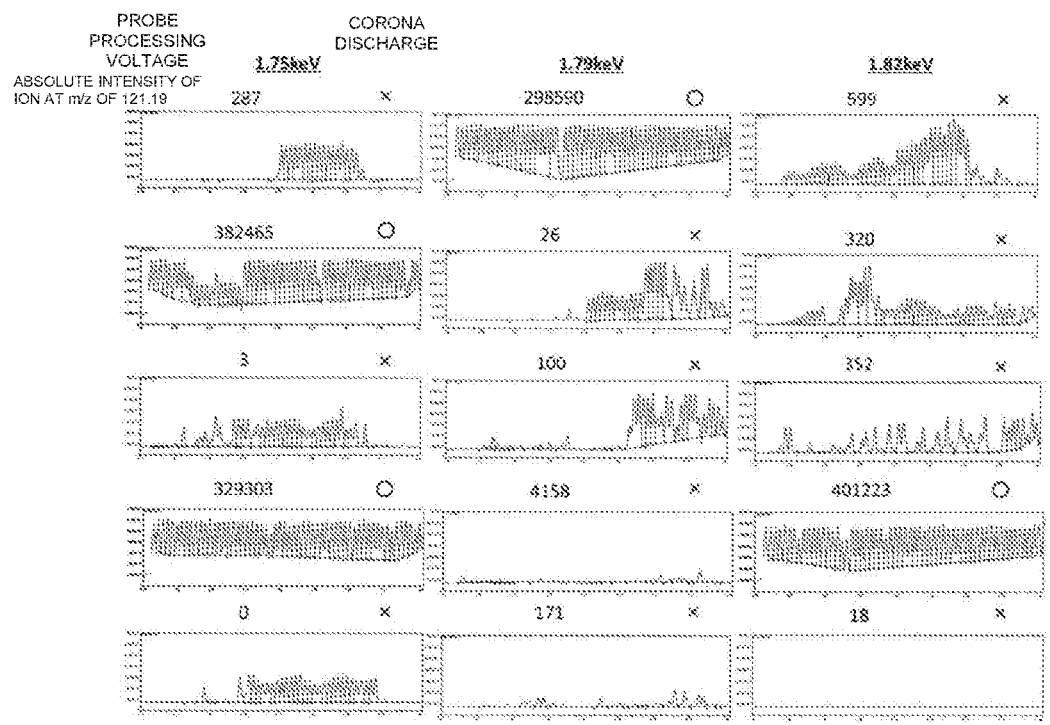

FIG. 8 shows in another form the relationship between the magnitude of the corona discharge voltage and the ionization efficiency.

Figure 9:
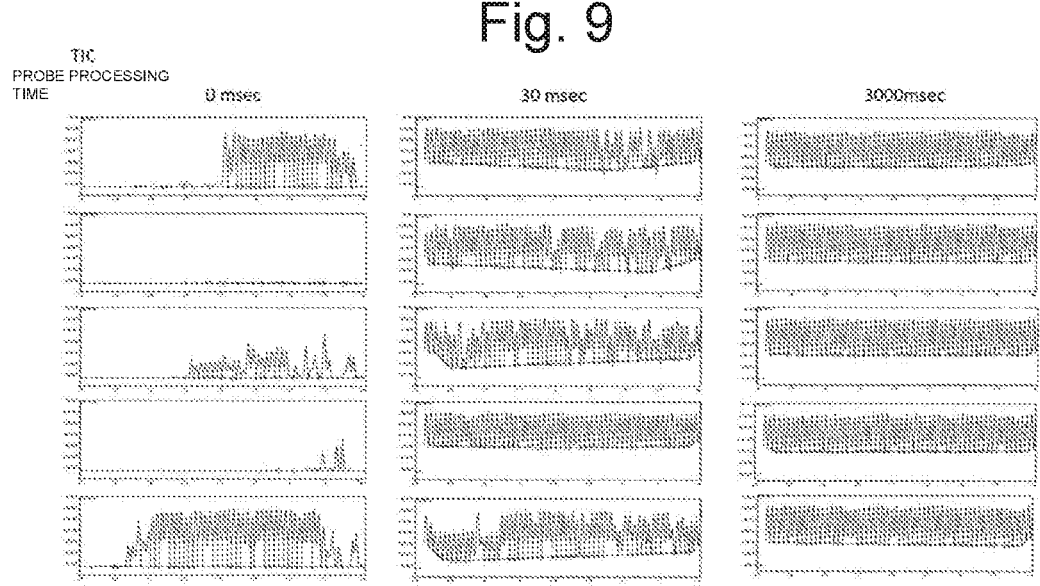

FIG. 9 shows a relationship between a corona discharge voltage application time and the ionization efficiency, based on the temporal changes in measured intensities of all the ions.

Figure 10:
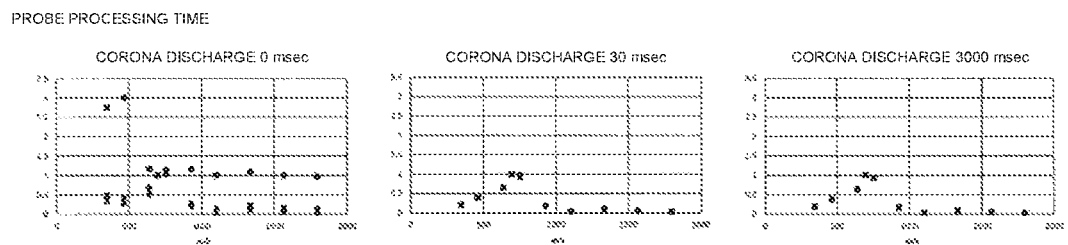

FIG. 10 shows the relationship between the corona discharge voltage application time and the ionization efficiency, based on the relative intensities of the other ions, with respect to the measured intensity of the ion at the mass-to-charge ratio (m/z) of 695 for each measurement.

Figure 11:
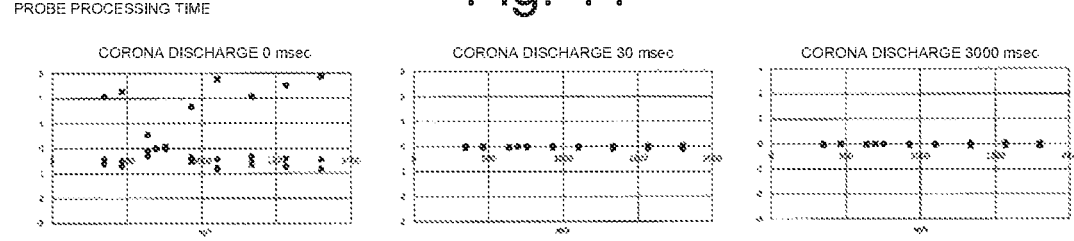

FIG. 11 shows the relationship between the corona discharge voltage application time and the ionization efficiency, based on the deviations between the measured intensities of the respective ions for the respective measurements and the average value of the measured intensities of the respective ions.

Figure 12:
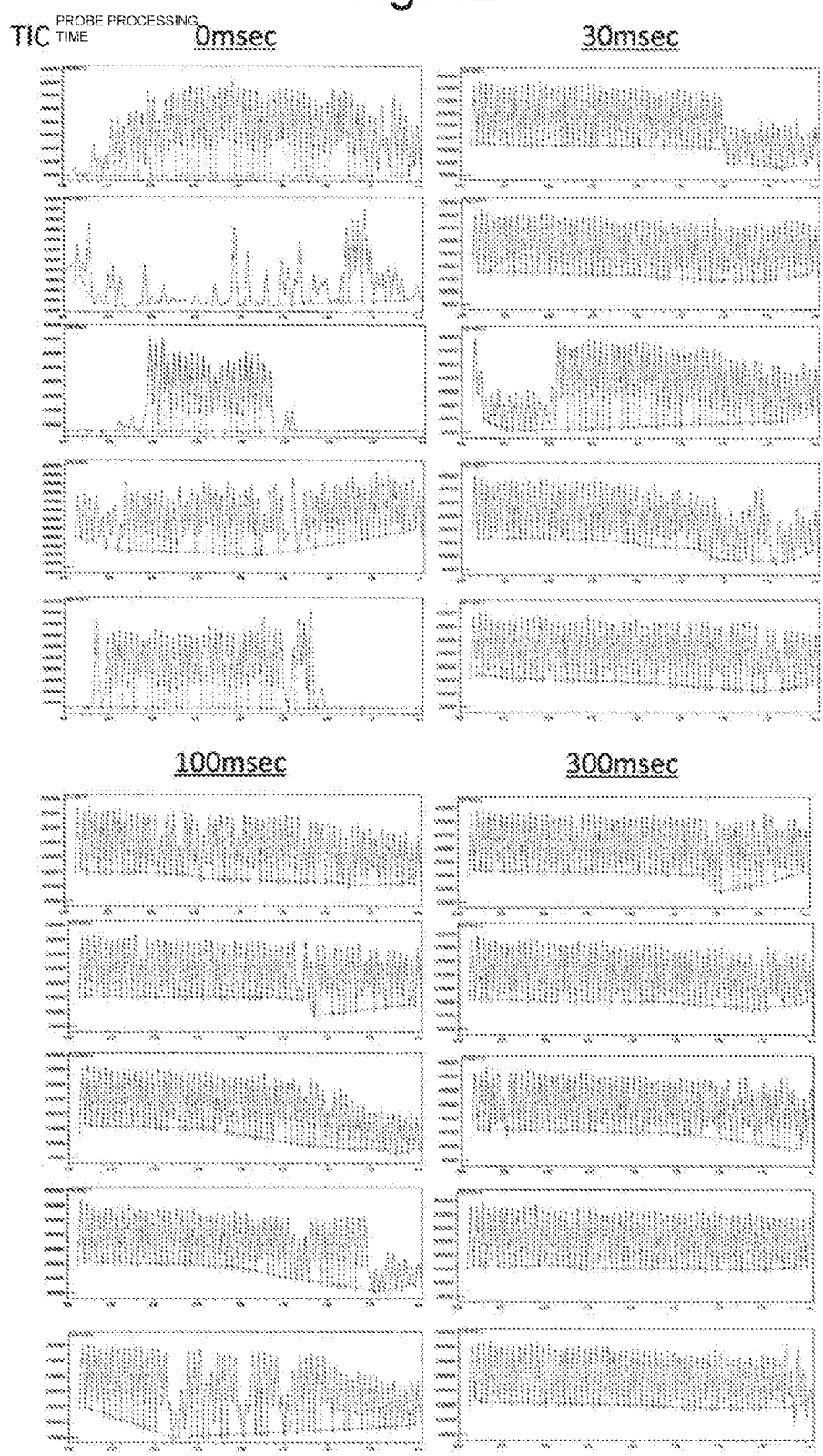

FIG. 12 shows in another form the relationship between the corona discharge voltage application time and the ionization efficiency, based on the temporal changes in measured intensities of all the ions.

Figure 13:
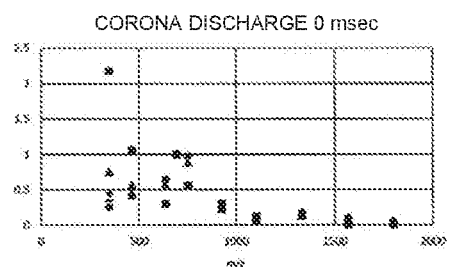
Figure 13:
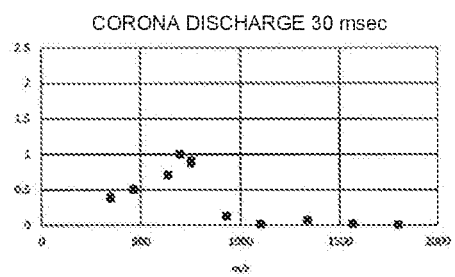
Figure 13:
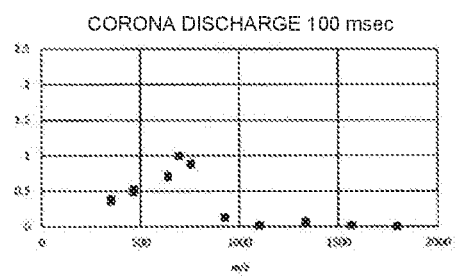
Figure 13:
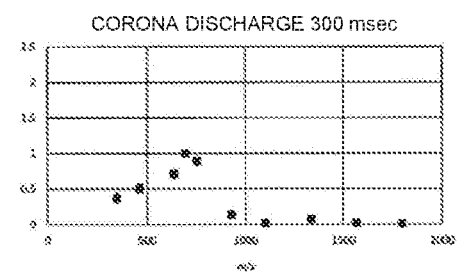

FIG. 13 shows in another form the relationship between the corona discharge voltage application time and the ionization efficiency, based on the relative intensities of the other ions, with respect to the measured intensity of the ion at the mass-to-charge ratio (m/z) of 695 for each measurement.

Figure 14:
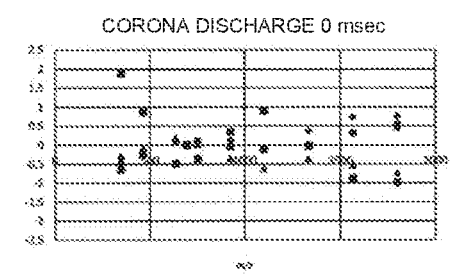
Figure 14:
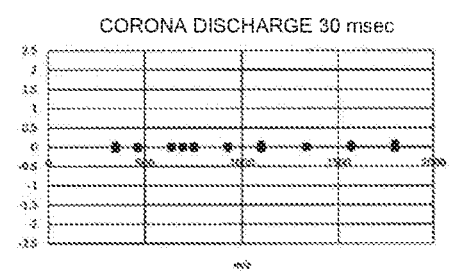
Figure 14:
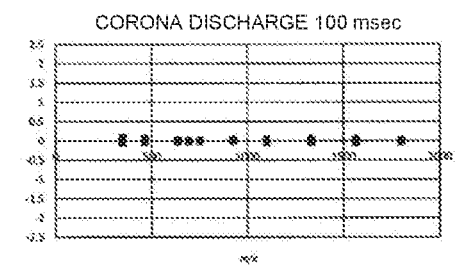
Figure 14:
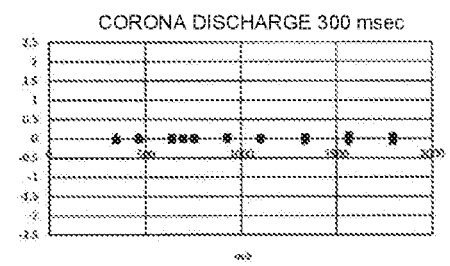

FIG. 14 shows in another form the relationship between the corona discharge voltage application time and the ionization efficiency, based on the deviations between the measured intensities of the respective ions for the respective measurements and the average value of the measured intensities of the respective ions.

Figure 15:
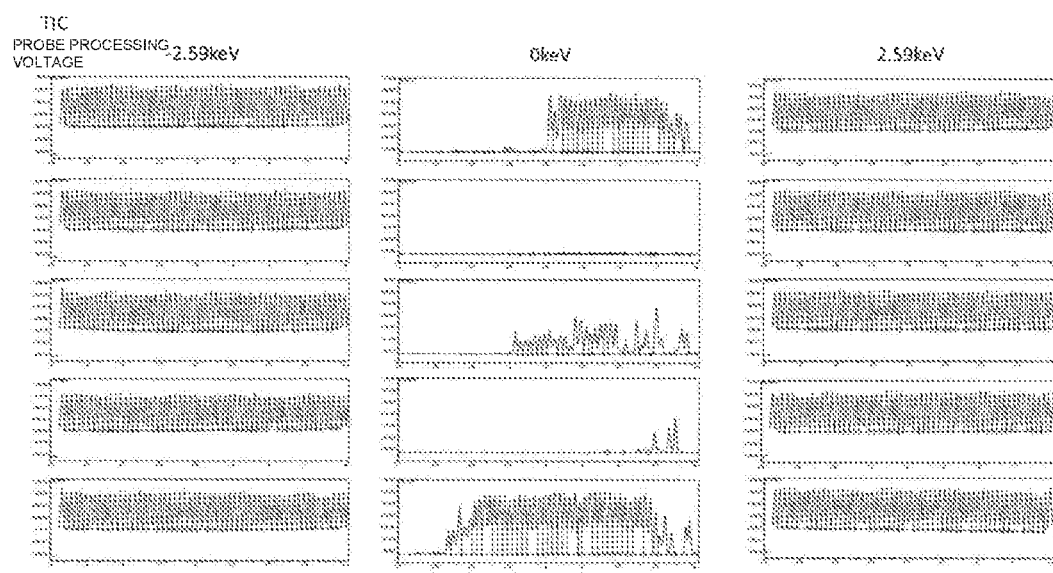

FIG. 15 shows a relationship between a polarity of the corona discharge voltage and the ionization efficiency, based on the temporal changes in measured intensities of all the ions.

Figure 16:
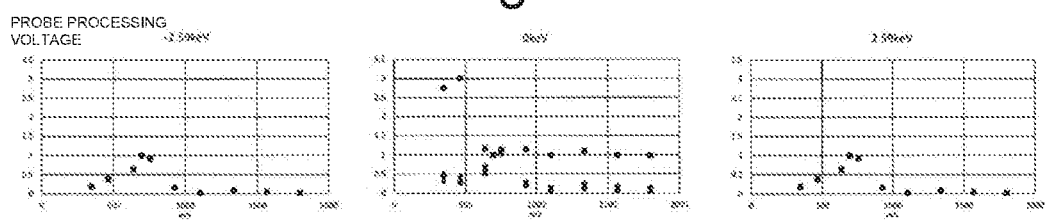

FIG. 16 shows the relationship between the polarity of the corona discharge voltage and the ionization efficiency, based on the relative intensities of the other ions, with respect to the measured intensity of the ion at the mass-to-charge ratio (m/z) of 695 for each measurement.

Figure 17:
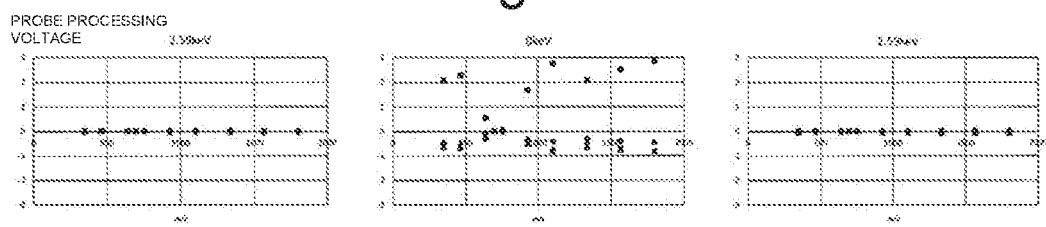

FIG. 17 shows the relationship between the polarity of the corona discharge voltage and the ionization efficiency, based on the deviations between the measured intensities of the respective ions for the respective measurements and the average value of the measured intensities of the respective ions.

Figure 18:
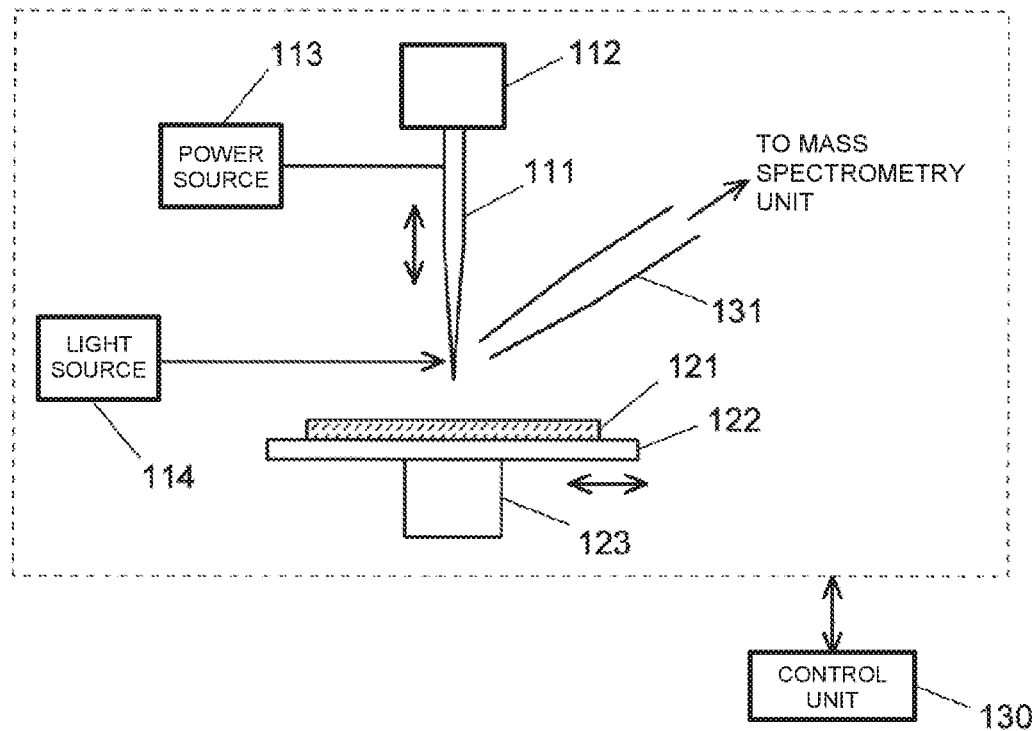

FIG. 18 shows a modification of the ionization device according to the present invention.

Figure 19:
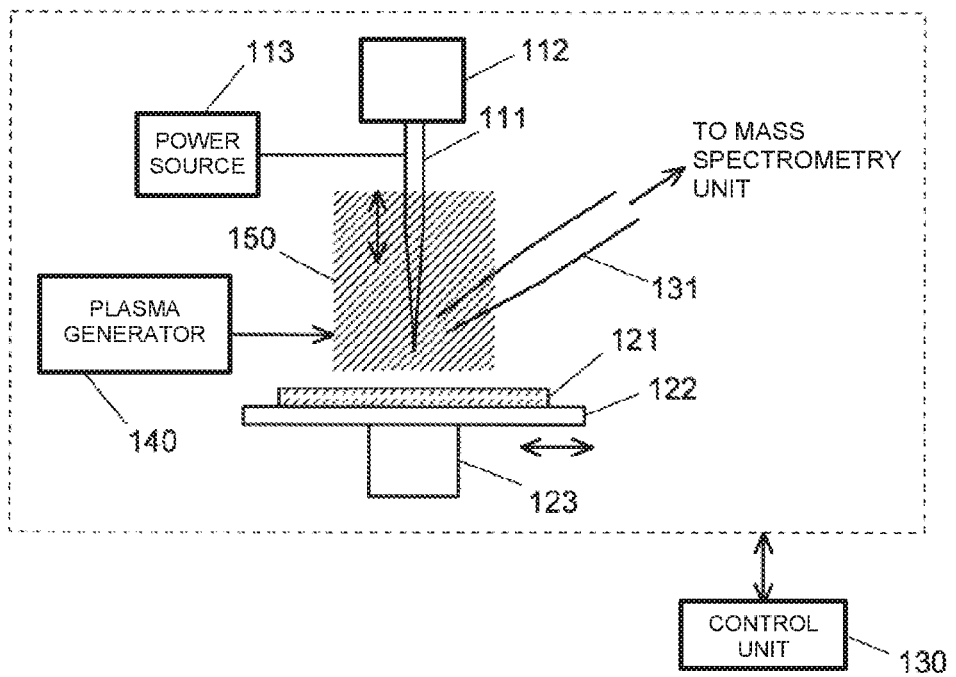

FIG. 19 shows another modification of the ionization device according to the present invention.

Figure 20:
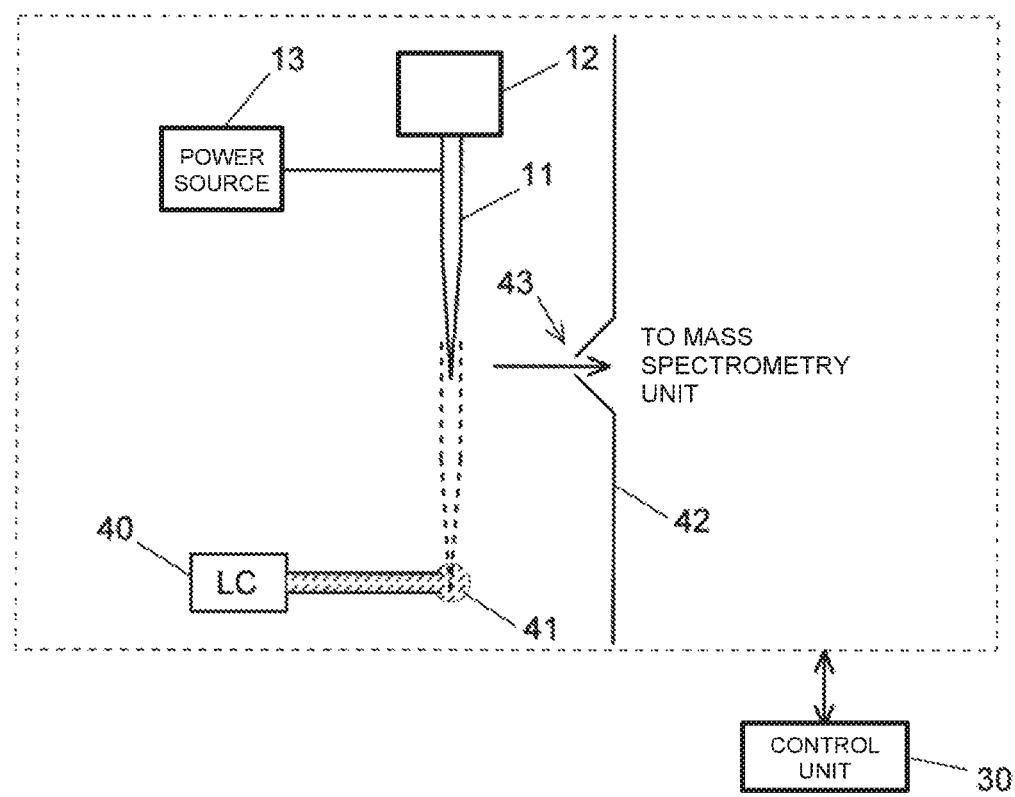

FIG. 20 shows still another modification of the ionization device according to the present invention.

DESCRIPTION OF EMBODIMENTS

An ionization method and an ionization device according to embodiments of the present invention will described below with reference to the drawings. The ionization method according to the present embodiment is a PESI method, and the ionization device according to the present embodiment is used as an ion source for a mass spectrometer. The ionization device according to the present embodiment is located m an ionization chamber that is at substantially atmospheric pressure, and a sample is ionized in an ambience of atmospheric pressure.

Figure 1:
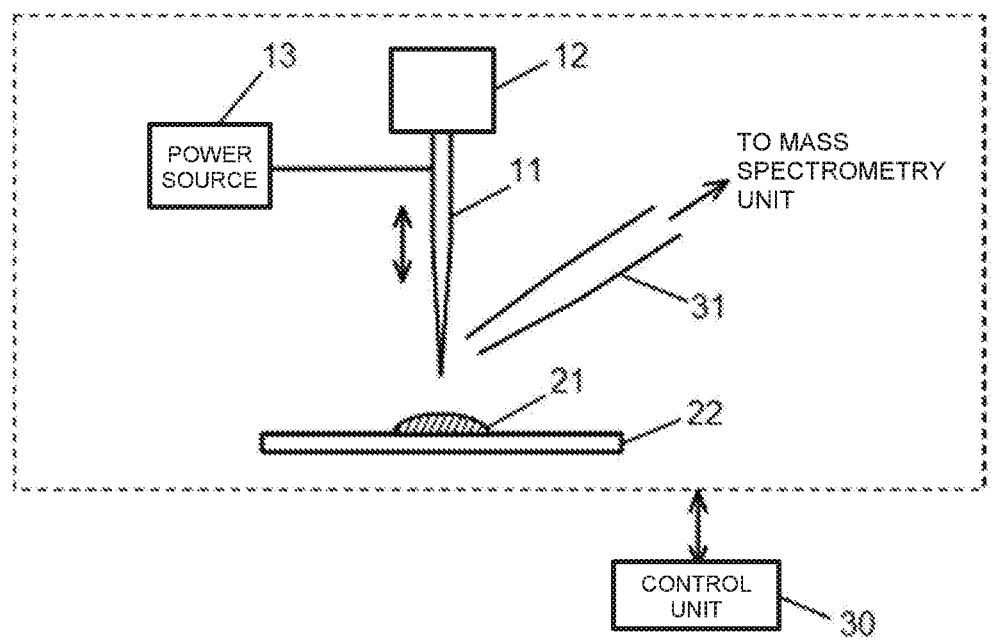
FIG. 1 is a configuration diagram of main components of an ionization device according an embodiment of to the present invention.

FIG. 1 shows a schematic configuration of the ionization device according to the present embodiment. The ionization device according to the present embodiment includes a probe 11, a probe moving mechanism 12, and a power source (voltage application unit) 13. The probe 11 is electrically conductive and has a tip with a diameter of several hundred nanometers. The probe moving mechanism 12 vertically moves the probe 11. The power source 13 applies a voltage to the probe 11. The ionization device also includes a sample stage 22 on which a sample 21 is placed. The ionization device further includes a control unit 30 that is configured to control operations of these components.

Figure 2:
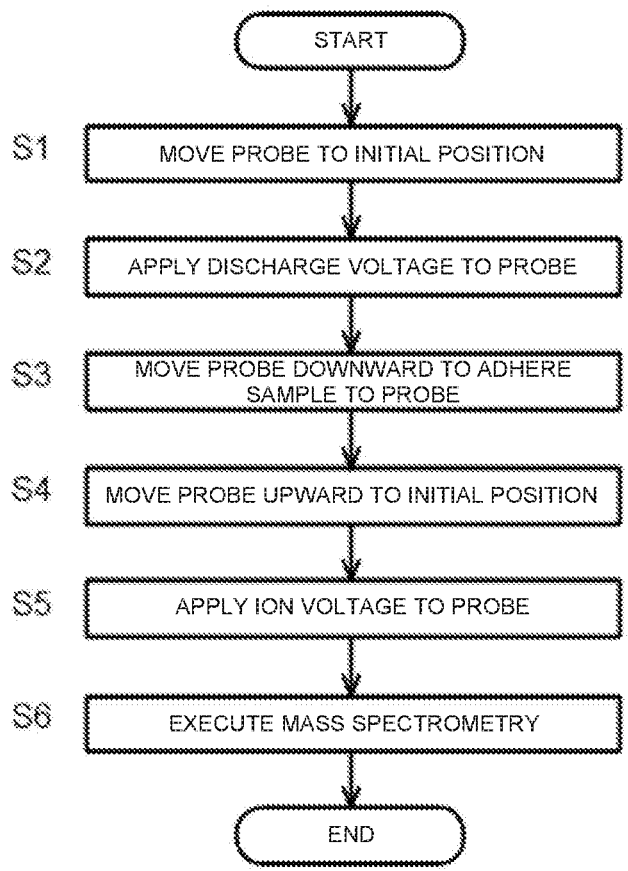
FIG. 2 is a flowchart of an ionization method according to an embodiment of the present invention.

Next, a process of the ionization method according to the present invention will be described with reference to a flowchart of FIG. 2.

When a user places the sample 21 on the sample stage 22 and commands a start of spectrometry, the control unit 30 operates the probe moving mechanism 12 to move the probe 11 to a predetermined height (step S1). The height at which the probe 11 is positioned (a relative position to the sample 21) represents an initial position of the probe 11.

After moving the probe 11 to the initial position, the control unit 30 subsequently applies a predetermined magnitude of voltage (2.59 keV m the present embodiment) to the probe 11 from the power source 13 to cause corona discharge at the probe 11 (step S2). The voltage applied at this time is referred to as a "discharge voltage". The discharge voltage varies in magnitude in accordance with, for example, a material of the probe 11. The magnitude of the discharge voltage is previously calculated by, for example, a preliminary experiment and is stored in the control unit 30. The corona discharge caused at the probe 11 makes a surface of the probe 11 homogenous. The term "homogeneous" used herein involves a state that is electrically homogeneous or physically homogeneous.

As will be described later, when the corona discharge is caused at the probe 11 as in the present embodiment, it has been found that sample ionization efficiency is stabilized as compared with a conventional method. The reason therefor is presumed as follows. The corona discharge removes an insulating film formed on the surface of the probe 11. Additionally, the corona discharge generates active oxygen to clean or reform the surface of the probe 11, or generates plasma to clean the surface of the probe 11 and form an even thin film on the cleaned surface. Consequently, the corona discharge makes the surface of the probe 11 homogenous. Making the surface of the probe 11 homogenous results in a constant amount of the sample 21 adhered to the probe constant and a homogenous electric field formed at application of an ionization voltage. Examples of the active oxygen generated by the corona discharge in the present embodiment include hydroxyl radical, superoxide anion radical, hydroperoxyl radical, hydrogen peroxide, singlet oxygen, nitrogen monoxide, nitrogen dioxide, and ozone, at least one of which may be generated to produce the effect described above.

When the corona discharge is caused at the probe 11, the control unit 30 resumes the operation of the probe moving mechanism 12 to move the probe 11 downward, and brings the tip of the probe 11 into contact with a surface of the sample 21. The sample 21 is thereby adhered to the tip of the probe 11 (step S3).

When the sample 21 is adhered to the tip of the probe 11, the control unit 30 operates the probe moving mechanism 12 to move the probe 11 upward to the original height (step S4). The probe 11 may be moved downward (step S3) and upward (step S4) only once each way. Alternatively, the probe 11 may be moved upward and downward repeatedly several times, or may be vibrated up and down. A frequency of moving or vibrating the probe 11 is appropriately set by taking into account how easily the sample 21 is adhered to the probe 11.

Subsequently, the control unit 30 applies another predetermined magnitude of voltage (1.72 keV in the present embodiment), which is different from the magnitude of the discharge voltage, to the probe 11 from the power source 13 (step S5). The voltage applied at this time is referred to as an "ionization voltage". The ionization voltage has a magnitude predetermined in accordance with properties of the sample 21, such as how easily the sample 21 is ionized. The magnitude of the ionization voltage is stored in the control unit 30.

The ionization voltage applied in step S5 electrically charges the sample 21, thereby ionizing the sample 21 by Coulomb repulsion. Ions thus generated pass through an ion introduction tube 31 formed in a partition wall that separates the ionization chamber from a mass separation unit maintained under a vacuum condition and disposed subsequently to the ionization chamber, and then is subjected to spectrometry (step S6).

In the ionization method according to the present embodiment and the ionization device according to the present embodiment, the discharge voltage is applied to the probe 11 to cause the corona discharge before the sample 21 is adhered to the probe 11. With this configuration, the corona discharge is presumed to remove the insulating film formed on the surface of the probe 11 and also generate the active oxygen or plasma so as to make the surface of the probe 11 homogenous. This configuration increases efficiency of voltage application to the sample 21 adhered to the tip of the probe 11 and causes stable generation of the ions.

In order to confirm an effect of the foregoing embodiment where the corona discharge is caused on the probe 11 before the sample 21 is adhered to the probe 11, and in order to identify a condition required to cause the corona discharge, a measurement was performed by the present inventor as follows. In each of the measurements, a probe made of stainless steel was used. As a standard sample, (triol-type) polypropylene glycol (PPGT) was used. The PPGT was placed on a sample plate, and the tip of the probe 11 was brought into contact with the PPGT.

Example 1

In Example 1, a voltage (discharge voltage) of +2.59 keV was applied to a probe for 300 msec to cause corona discharge on the probe. The probe was then moved downward, and PPGT at a constant concentration was adhered to a tip of the probe. The probe was then moved upward, and a voltage (ionization voltage) of +1.72 keV was applied to the probe. For each ion thus generated, a scan measurement to scan a mass range of mass-to-charge ratio (m/z) from 10 to 2000 was repeatedly performed at an interval of 10 seconds. In addition, as Comparative Example 1, a measurement similar to the measurement above was performed without causing the corona discharge.

Figure 3:
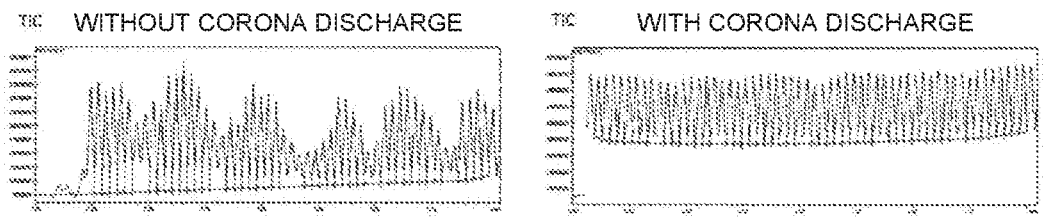
FIG. 3 shows temporal changes in measured intensities of all ions in Example 1 (with corona discharge) and Comparative Example 1 (without corona discharge).
Figure 4:
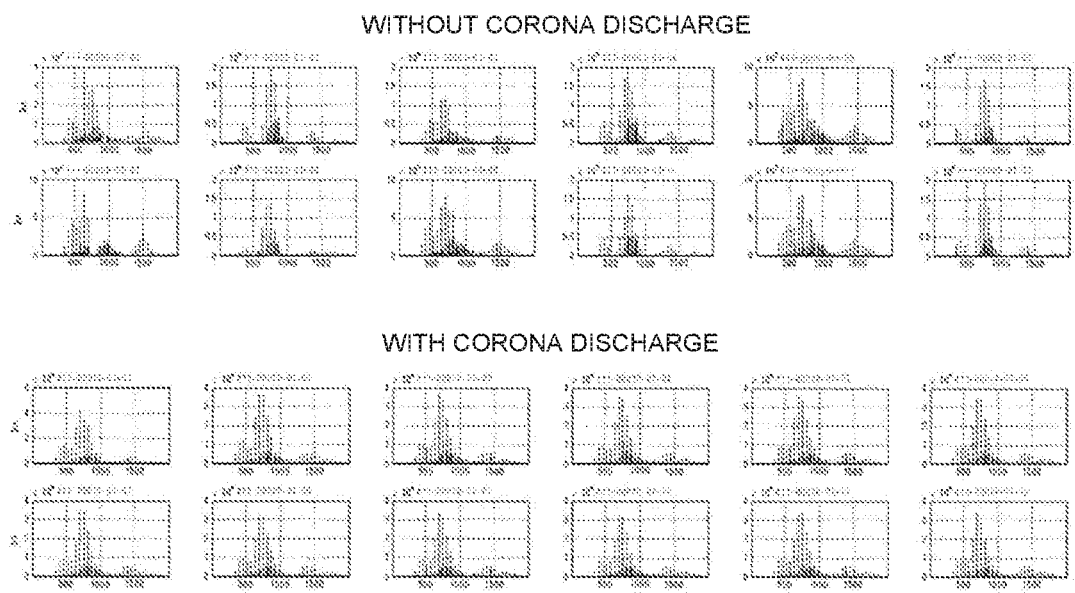
FIG. 4 shows comparisons of a plurality of mass spectra obtained successively in Example 1 (with corona discharge) and Comparative Example 1 (without corona discharge).

FIG. 3 shows temporal changes in integrated values of measured intensities of all the ions (the measured intensities of all the ions m mass spectrometry executed at the interval of 10 seconds are sequentially displayed). In FIG. 3, the left graph shows the results in Comparative Example 1 (without corona discharge), and the right graph shows the results in Example 1 (with corona discharge). FIG. 4 shows mass spectra obtained by mass spectrometry performed each time at the interval of 10 seconds. In FIG. 4, the upper graphs show Comparative Example 1 (without corona discharge), and the lower graphs show Example 1 (with corona discharge). In Comparative Example 1, as shown in the left graph of FIG. 3, the measured intensity significantly varies in each measurement, and as shown in the upper graphs of FIG. 4, the peak intensity in the mass spectrum obtained from each measurement indicates a different pattern. In a contrast, in Example 1, as shown in the right graph of FIG. 3, the measured intensity obtained from each measurement is stable, and as shown in the lower graphs of FIG. 4, the peak intensity in each of the mass spectra indicates a constant pattern so that a good, highly reproducible mass spectrum is obtained.

In mass spectrometry, a substance may be identified by comparing a pattern of a peak intensity of a mass spectrum obtained with a pattern of a peak intensity of a mass spectrum of a known compound that is previously stored in a database. Alternatively, based on a degree of matching between the pattern of the peak intensity of the mass spectrum obtained and the pattern of the peak intensity previously prepared, the mass spectrum may be subjected to filtering. Conventionally, a pattern of a peak intensity of a mass spectrum varies in each measurement, resulting in wrong identification or filtering in mass spectrometry as described above. The use of the method and device according to the present embodiment enables correct identification and filtering.

Example 2

In Example 2, as to each ion generated by adhering a sample to a probe after causing corona discharge on the probe, a scan measurement to scan a mass range of mass-to-charge ratio (m/z) from 10 to 2000 was repeated for two minutes and four times to obtain an integrated mass spectrum. From the respective integrated mass spectra, measured intensities of the ions at a plurality of different mass-to-charge ratios (m/z, 347, 463, 637, 695, 753, 927, 1101, 1333, 1566, 1798) were extracted. As Comparative Example 2, a measurement similar to the measurement above was performed without the corona discharge so as to make a comparison with the result of Example 2.

Figure 5:
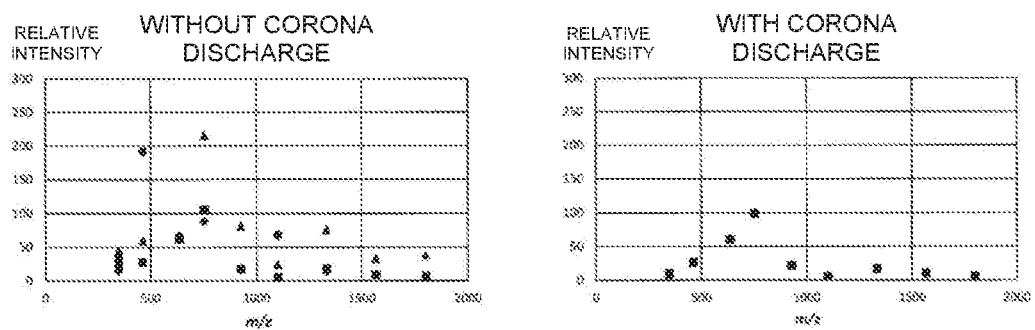
FIG. 5 shows relative intensities of other ions in Example 2 (with corona discharge) and Comparative Example 1

FIG. 5 is plots of relative intensities of the ions at the respective mass-to-charge ratios in the scan measurements, with the intensity of the ion at the mass-to-charge ratio of 695 in each scan measurement defined as "100". In FIG. 5, the left graph shows Comparative Example 2 (without corona discharge), and the right graph shows Example 2 (with corona discharge). In Comparative Example 2, the ions at the same mass-to-charge ratio in the four measurements are different in relative intensity from one another, whereas in Example 2, the ions at the same mass-to-charge ratio in the four measurements are almost equal in relative intensity to one another (and thus, four plotted points according to each mass-to-charge ratio overlap one another). In FIG. 6, a difference between the measured intensity obtained from each measurement and an average value of the measured intensities obtained from the four measurements is plotted as a deviation of relative intensity from average value, with regard to the ions at the plurality of mass-to-charge ratios. It is apparent from FIG. 6 that the ions at the respective mass-to-charge ratios are different in measured intensity from one another in Comparative Example 2 (without corona discharge), whereas the ions at the respective mass-to-charge ratios are almost equal in measured intensity to one another in Example 2 (with corona discharge).

Example 3

In Example 3, a measurement similar to the measurement in Example 1 was performed while changing the magnitude of the discharge voltage described in the foregoing embodiment by 0.03 keV or 0.04 keV within a range from 1.72 keV to 1.89 keV, to confirm the magnitude of the discharge voltage required to cause corona discharge. The discharge voltage was applied for 3 sec each time.

FIG. 7 show magnitudes of the discharge voltage, temporal changes in integrated values of measured intensities of all ions, the measured intensity of the ions at the mass-to-charge ratio of 121.19, and results of determination as to whether the corona discharge was caused. The determination as to whether the corona discharge was caused was made based on whether the number of ions at the mass-to-charge ratio of 121.19 exceeded 100,000 in count. It is apparent from FIG. 7 that the corona discharge was not caused at 1.75 keV, but was caused at 1.79 keV.

FIG. 8 show results of measurements to apply voltages (1.75 keV, 1.79 keV, 1.82 keV) around 1.79 keV corresponding to a boundary voltage as to whether the corona discharge was caused in FIG. 7, the measurements being performed five times. It is apparent from FIG. 8 that the corona discharge was caused twice out of five times at 1.75 keV, once out of five times at 1.79 keV, and once out five times at 1.82 keV. From the results shown in FIG. 7 and FIG. 8, a voltage from 1.75 keV to 1.82 keV presumably represents a boundary for the discharge voltage to generate the corona discharge. By taking into account that the corona discharge is influenced by an individual difference in probes or others, a voltage higher than the boundary voltage is preferably applied to cause the corona discharge stably. In view of these points, the discharge voltage was set at 2.59 keV in the foregoing embodiment.

Example 4

In Example 4, in order to improve and stabilize the sample ionization efficiency, a test was performed to see an approximate time for applying the discharge voltage in the foregoing embodiment. The time for applying the discharge voltage to the probe was set at 0 msec (that means no application of the discharge voltage), 30 msec, and 3000 msec, and a measurement similar to the measurement in Example 1 was performed five times at each application time, as shown in FIG. 9.

At the discharge voltage application time of 0 msec (that corresponds to Comparative Example 1), as described in Comparative Example 1, the measured intensity of the ions significantly varies in each measurement. At the application time of 30 msec, the measured intensity of the ions is somewhat stabilized. At the application time of 3000 msec, the measured intensity of the ions is almost constant.

As in FIG. 5, FIG. 10 is plots of the relative intensities of the ions at the respective mass-to-charge ratios in the respective measurements, with the intensity of the ion at the mass-to-charge ratio of 695 in each measurement defined as "100". At the application time of 0 msec, in these five measurements, the ions at the same mass-to-charge ratio are different in measured intensity from one another. In a contrast, at the application time of 30 msec and at the application time of 3000 msec, the ions are almost equal m measured intensity to one another in the five measurements.

As in FIG. 6, FIG. 11 is plots of a difference between the measured intensity obtained from each measurement and an average value of the measured intensities obtained from the five measurements, with regard to the ions at the plurality of mass-to-charge ratios. At the application time of 0 msec, the ions at the same mass-to-charge ratio are different in measured intensity from one another. In a contrast, at the application time of 30 msec and at the application time of 3000 msec, the ions are almost equal in measured intensity to one another. By taking FIG. 9. FIG. 10, and FIG. 11 into account, at the application time of 30 msec, the measured intensity of the ions somewhat varies in each measurement, while the peak intensity of the mass spectrum shows an identical pattern. At the application time of 3000 msec, not only the pattern of the peak intensity the mass spectrum but also the peak intensity itself is almost constant.

In order to see a result in a case where the discharge voltage application time is set within a range from 30 msec to 3000 msec, another measurement similar to the measurement above was performed at the application time of 100 msec and at the application time of 300 msec FIG. 12, FIG. 13 and FIG. 14 respectively show the results. FIG. 12, FIG. 13 and FIG. 14 respectively correspond to FIG. 9, FIG. 10, and FIG. 11; therefore, the detailed description thereof will not be given here. As seen from these results, by setting the application time at 30 msec or more, the ionization efficiency as a result of the corona discharge is effectively stabilized, and an increase in the application time further increases the stabilization.

Example 5

In Example 5, by applying a discharge voltage at three different magnitudes, −2.59 keV, 0 keV, and +2.59 keV, a measurement similar to the measurement in Example 1 (and Comparative Example 1) was performed to confirm whether a polarity of the discharge voltage influences an effect of corona discharge. The measurement was performed five times for each magnitude. It is apparent from FIG. 15. FIG. 16, and FIG. 17 that, regardless of the polarity of the discharge voltage, the corona discharge improves and stabilizes ionization efficiency.

The foregoing embodiment is merely an example of the present invention, and thus any modification may be appropriately made within a range not deviating from the spirit of the present invention.

When the corona discharge was caused on the probe 11 as in the foregoing embodiment, the present inventor confirmed that blue-emitting plasma was simultaneously generated. This indicates that state, glow discharge is caused concurrently with the corona discharge. In the foregoing embodiment, the glow discharge caused concurrently with the corona discharge is confirmed; however, only the glow discharge is presumed to produce an effect similar to the effect above.

Further, the present invention is based on a technical concept of "subjecting a probe to treatment to make a surface of the probe homogenous". Accordingly, such treatment may be implemented by other methods in addition to the corona discharge or the glow discharge. For example, as shown in FIG. 18, the ionization device may include a light source 114 for irradiating the probe 11 with ultraviolet light to generate active oxygen before the sample 121 is adhered to the probe 11. In this configuration, the treatment is also implemented to make the surface of the probe 11 homogenous. Alternatively, as shown in FIG. 19, the ionization device may include a plasma generator 140 for generating plasma 150 in the vicinity of the probe 11, thereby implementing the treatment for making the surface of the probe 11 homogenous. The plasma generator 140 may employ a variety of conventionally known configurations, such as a plasma generator configured to generate plasma by radiofrequency, voltage application or a plasma generator configured to generate plasma by microwave irradiation.

In Examples 1 to 5, a polymer solution was subjected to mass spectrometry. Alternatively, as shown in FIG. 20 for example, a liquid sample, such as an eluate 41 segregated in a column for a liquid chromatograph 40, may be adhered to a tip of a probe to be ionized. Then, ions generated are sent through an ion introduction opening 43 formed in a partition wall 42 that separates an ionization chamber from a mass separation unit disposed subsequently to the ionization chamber.

In measuring a solid sample or measuring a sample less prone to being ionized, the tip of the probe may be irradiated with laser light at application of an ionization voltage. Then, energy is applied to the sample to facilitate the ionization. This configuration may also employ the corona discharge of the present invention, thereby obtaining excellent reproducibility in spectrometry of the solid sample or the sample less prone to being ionized. For example, in the configuration shown in FIG. 18, the light source 114 for implementing the treatment to make the surface of the probe 11 homogenous may be used to facilitate ionization of the sample 21. Alternatively, this configuration may include an individual light source for each purpose.

In FIGS. 18 and 19, the ionization device further includes a sample stage moving mechanism 123 configured to horizontally move the sample stage 122, and a light source 114 configured to irradiate the sample 121 adhered to the tip of the probe 111 with laser light, in addition to the light source 114 or the plasma generator 140. Also, in addition to the functions of the control unit 30 described in the foregoing embodiment, a control unit 13 performs ionization and mass spectrometry at a plurality of measurement points on the surface of the sample 121. By executing steps S1 to S6 (and irradiating with laser light as circumstances demand) at each of the plurality of measurement points on the surface of the sample 121 in these ionization devices, it is possible to perform imaging mass spectrometry on, for example, a piece of biological tissue. In the PESI method, a probe having a nanometer-scale tip enables imaging mass spectrometry with a spatial resolution at nanometer level. In this configuration, the corona discharge according to the present invention allows the ionization devices to perform the imaging mass spectrometry in higher accuracy than the conventional imaging mass spectrometry.

Each of the examples above describes mass spectrometry for generated ions but alternatively, the device may be configured to perform other types of spectrometry, such as ion mobility spectrometry.

REFERENCE SIGNS LIST 11, 111 . . . Probe
12, 112 . . . Probe Moving Mechanism
13, 113 . . . Voltage Application Unit
21 . . . Sample
22 . . . Sample Stage
30, 130 . . . Control Unit
31, 131 . . . Ion Introduction Tube
40 . . . Liquid Chromatograph
41 . . . Eluate
42 . . . Partition Wall
43 . . . Ion Introduction Opening
114 . . . Light Source
123 . . . Sample Stage Moving Mechanism
140 . . . Plasma Generator
150 . . . Plasma

The invention claimed is:

1. An ionization method for ionizing a sample adhered to a tip of a probe that is electrically conductive, by applying an ionization voltage to the probe,
the ionization method comprising:
making a surface of the probe homogenous, by applying a discharge voltage to the probe to cause corona discharge or glow discharge, without adhesion of the sample to the tip of the probe;
causing adhesion of the sample to the tip of the probe; and
ionizing the sample by applying the ionization voltage to the probe to electrically charge the sample, the ionization voltage being lower than the discharge voltage and a voltage causing corona discharge,
wherein the causing step and the ionization step are repeated multiple times and the making step is performed before each of at least two times of the causing step.

2. The ionization method according to claim 1, wherein the voltage to be applied to the tip of the probe upon application of the discharge voltage has an absolute value of magnitude that is 1.8 keV or more.

3. The ionization method according to claim 1, wherein the discharge voltage is applied to the probe for 30 msec or longer.

4. The ionization method according to claim 1, wherein the sample is adhered to the tip of the probe by changing a relative position between the probe and the sample.

5. The ionization method according to claim 1, wherein the surface of the probe is made homogenous by active oxygen including at least one of hydroxyl radical, superoxide anion radical, hydroperoxyl radical, hydrogen peroxide, singlet oxygen, nitrogen monoxide, nitrogen dioxide, and ozone.

6. The ionization method according to claim 1, wherein the sample is irradiated with laser light in applying the voltage to the probe to electrically charge the sample.

7. The ionization method according to claim 1, wherein the making the surface of the probe homogenous comprises sequentially applying the discharge voltage to the probe to cause corona discharge or glow discharge, without adhesion of a plurality of samples to the tip of the probe;
causing adhesion of each sample to the tip of the probe; and ionizing each sample by applying the ionization voltage to the probe to electrically charge the sample,
wherein the discharge voltage is applied to the probe before adhering each of the plurality of samples to the probe.

8. An imaging spectrometry method comprising:
generating ions at a plurality of points on a surface of a sample by the ionization method according to claim 1 and conducting spectrometry of the generated ions.

9. The imaging spectrometry method according to claim 8, wherein
the spectrometry is mass spectrometry.

10. An ionization method for ionizing a sample adhered to a tip of a probe that is electrically conductive, by applying an ionization voltage to the probe,
the ionization method comprising:
making a surface of the probe homogenous by irradiating the probe with ultraviolet light without adhesion of the sample to the tip of the probe;
causing adhesion of the sample on the homogenized surface of the probe; and
ionizing the sample by applying the ionization voltage to the probe to electrically charge the sample,
wherein the causing step and the ionization step are repeated multiple times and the making step is performed before each of at least two times of the causing step.

11. The ionization method according to claim 10, wherein the sample is adhered to the tip of the probe by changing a relative position between the probe and the sample.

12. The ionization method according to claim 10, wherein the surface of the probe is made homogenous by active oxygen including at least one of hydroxyl radical, superoxide anion radical, hydroperoxyl radical, hydrogen peroxide, singlet oxygen, nitrogen monoxide, nitrogen dioxide, and ozone.

13. The ionization method according to claim 10, wherein the sample is irradiated with laser light in applying the voltage to the probe to electrically charge the sample.

14. An imaging spectrometry method comprising:
generating ions at a plurality of points on a surface of a sample by the ionization method according to claim 10 and conducting spectrometry of the generated ions.

15. The imaging spectrometry method according to claim 14, wherein
the spectrometry is mass spectrometry.

16. An ionization device comprising:
a probe that is electrically conductive;
a voltage application unit configured to:
apply a discharge voltage to the probe to cause corona discharge or glow discharge at the probe to make a surface of the probe homogenous without adhesion of the sample to the tip of the probe; and
apply an ionization voltage to the probe to electrically charge and ionize a sample adhered to the probe, the ionization voltage being lower than the discharge voltage and a voltage causing corona discharge;
a sample introduction unit configured to cause adhesion of the sample to a tip of the probe; and
a control unit configured to cause the voltage application unit and the sample introduction unit to repeat the adhesion and ionization of the sample by applying the ionization voltage multiple times, and to make the surface of the probe homogeneous before each of at least two times of the adhesion.

17. The ionization device according to claim 16, wherein the sample introduction unit includes a moving mechanism configured to change a relative position between the probe and the sample to a first position at which the tip of the probe is separate from the sample, and to a second position at which the tip of the probe is in contact with the sample, and
the control unit applies the discharge voltage to the probe at the first position, change the relative position to the second position, and applies the ionization voltage to the probe.

18. The ionization device according to claim 16, further comprising:
a laser light source configured to irradiate the tip of the probe at a position at which the tip of the probe is separate from the sample with laser light,
wherein
the control unit causes the laser light source to irradiate the probe having the tip, to which the sample is adhered, with the laser light.

19. The ionization device according to claim 16, wherein
the voltage application unit is configured to apply the discharge voltage to the probe to cause corona discharge or glow discharge at the probe to make a surface of the probe homogenous without adhesion of a plurality of samples to the a tip of the probe;
the sample introduction unit is configured to cause adhesion of the plurality of samples to the tip of the probe; and
the control unit is configured to cause the voltage application unit and the sample introduction unit to apply the discharge voltage to the probe, to cause the adhesion of the plurality of samples to the tip of the probe, and to apply the ionization voltage to the probe, where the irradiation of the ultraviolet light is performed before each of the plurality of samples is adhered to the probe for ionization.

20. An imaging spectrometer comprising:
the ionization device according to claim 16, further including a sample stage, and a moving mechanism configured to move a relative position between the probe and the sample placed on the sample stage; and
a spectrometry unit configured to conduct spectrometry of ions generated from a plurality of positions on the sample.

21. The imaging spectrometer according to claim 20, wherein
the spectrometry is mass spectrometry.

22. An ionization device comprising:
a probe that is electrically conductive;
a light source configured to irradiate the probe with ultraviolet light to make a surface of the probe homogenous without adhesion of the sample to the tip of the probe;
a voltage application unit configured to apply an ionization voltage to the probe to electrically charge and ionize a sample adhered to the probe;
a sample introduction unit configured to cause adhesion of the sample on the homogenized surface of the probe of the probe; and
a control unit configured to cause the light source, the voltage application unit, and the sample introduction unit to repeat the adhesion and ionization of the sample by applying the ionization voltage multiple times, and to make the surface of the probe homogeneous before each of at least two times of the adhesion.

23. The ionization device according to claim 22, further comprising:

a laser light source configured to irradiate the tip of the probe at a position at which the tip of the probe is separate from the sample with laser light,
wherein
the control unit causes the laser light source to irradiate the probe having the tip, to which the sample is adhered, with the laser light.

24. An imaging spectrometer comprising:
the ionization device according to claim 22, further including a sample stage, and a moving mechanism configured to move a relative position between the probe and the sample placed on the sample stage; and
a spectrometry unit configured to conduct spectrometry of ions generated from a plurality of positions on the sample.

25. The imaging spectrometer according to claim 24, wherein
the spectrometry is mass spectrometry.

* * * * *